United States Patent
Ansel

[15] 3,650,510
[45] Mar. 21, 1972

[54] MIXING AND AERATING APPARATUS FOR PLASTICS

[72] Inventor: Ferman L. Ansel, Arvada, Colo.
[73] Assignee: Denver Brick and Pipe Company, Denver, Colo.
[22] Filed: Apr. 3, 1970
[21] Appl. No.: 25,334

[52] U.S. Cl. ..............................................259/9
[51] Int. Cl. ..........................B01f 7/02, B01f 7/08
[58] Field of Search .................259/9, 10, 7, 8, 5, 6, 23, 259/24, 25, 26, 45, 46, 43, 44; 23/252

[56] References Cited

UNITED STATES PATENTS

| | | | |
|---|---|---|---|
| 3,207,486 | 9/1965 | Rosenthal | 259/8 |
| 3,385,671 | 5/1968 | Axelsson | 259/8 X |
| 3,068,074 | 12/1962 | Boekemeier | 259/8 X |
| 3,220,801 | 11/1965 | Rill | 259/8 |

Primary Examiner—Robert W. Jenkins
Attorney—Sheridan, Ross and Burton

[57] ABSTRACT

Mixing apparatus for liquid plastics, such as polyesters, polyurethane elastomers and polyurethane foams, and liquid additives to same, for effecting certain reactions, characterized by a plurality of mixing rotors which may be optionally employed with basic drive mechanism and liquid supply conduits, common to all rotors, to thereby provide apparatus of variable utility, for the various plastics, by minimizing the number of operative parts required. For certain foaming plastics, air is aspirated into the rotor mixing chamber to provide the required air for initiating foaming by subsequent chemical reaction. For other plastics which require a high shearing action during mixing, alternative forms of rotors are employed which move the plastic in a tortuous path for effecting such action. All rotors are driven at the same speed by a direct drive motor which rotates at 1,700–1,800 r.p.m. (four pole motor) as distinguished from former required speeds of the order of 6,000 r.p.m.

7 Claims, 7 Drawing Figures

Patented March 21, 1972 3,650,510
2 Sheets-Sheet 1
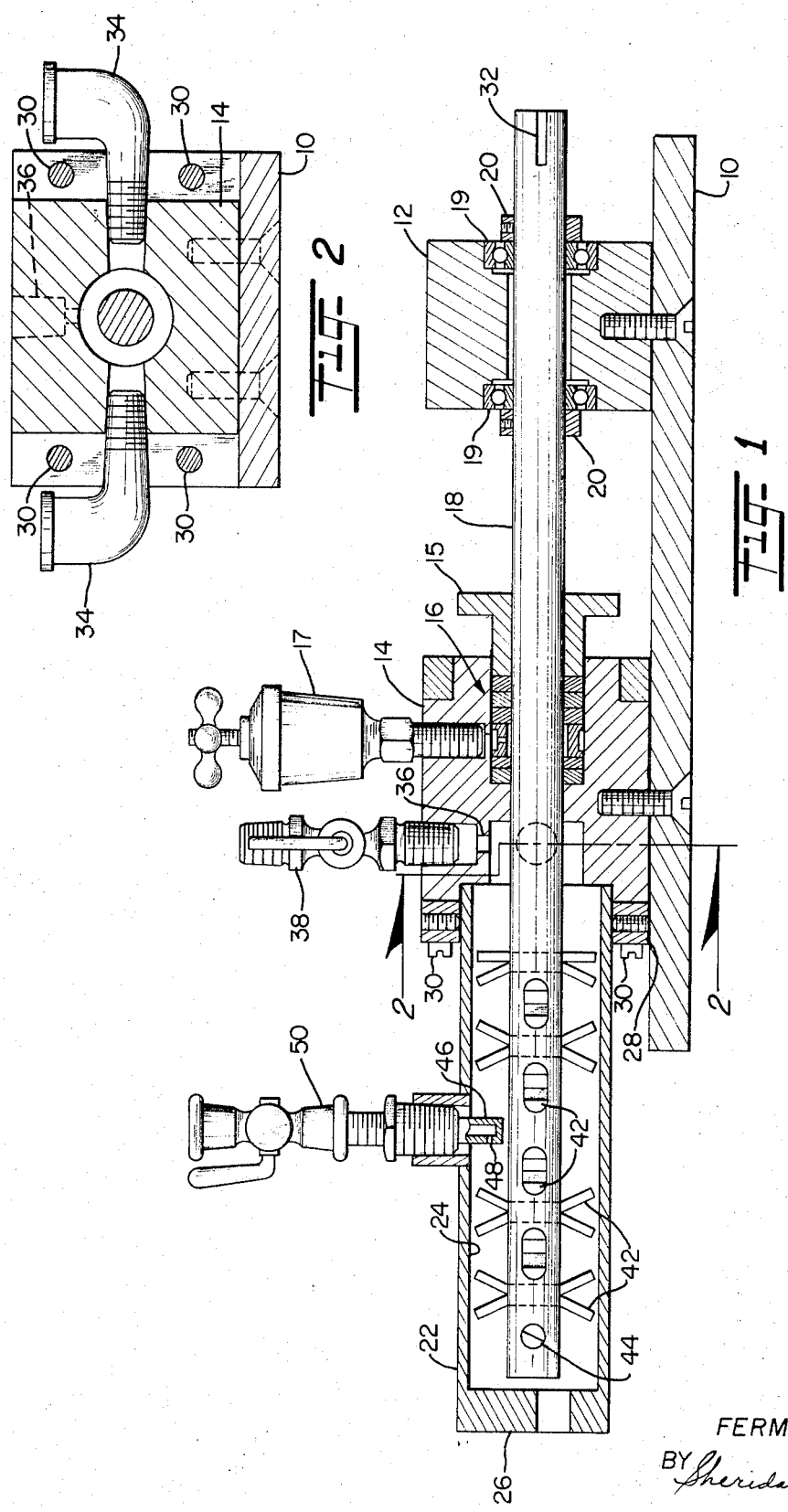
INVENTOR
FERMAN L. ANSEL
BY Sheridan, Ross & Burton
ATTORNEYS

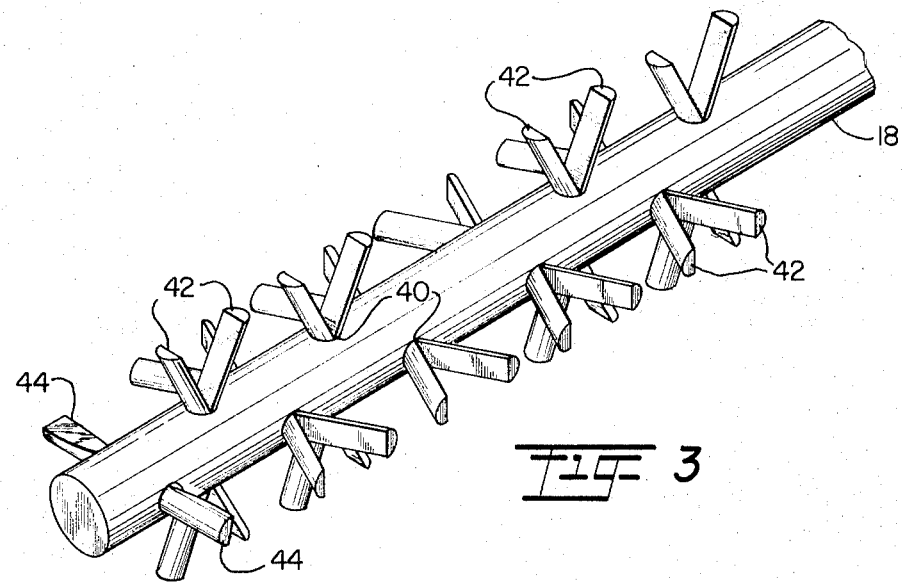
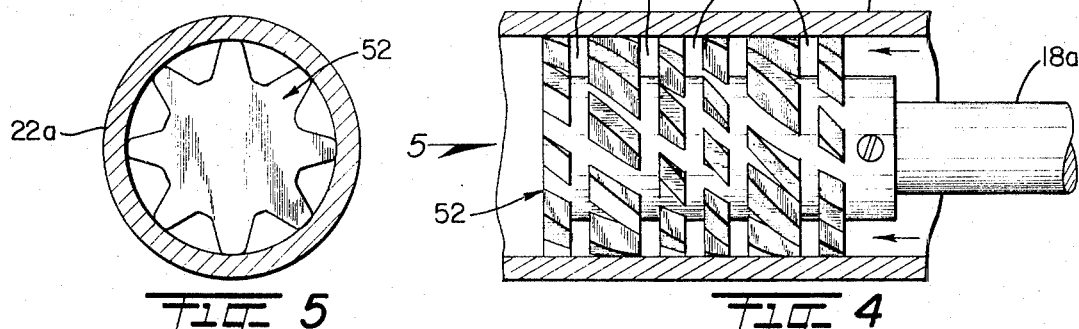
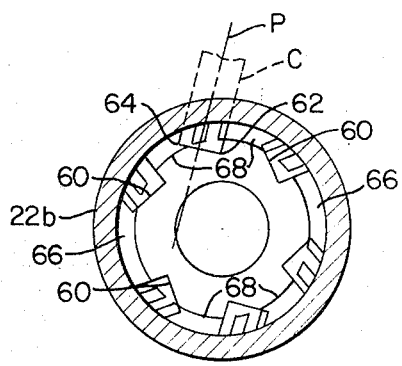
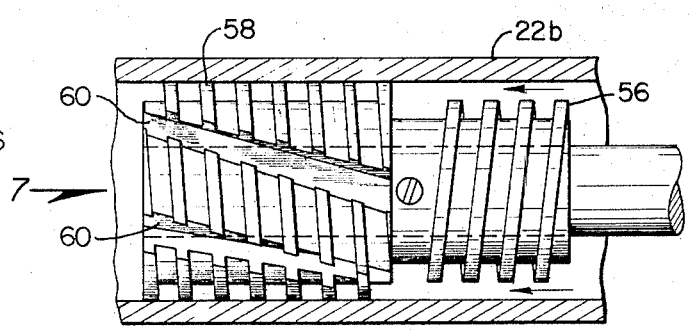
INVENTOR
FERMAN L. ANSEL
BY Sheridan, Ross + Burton
ATTORNEYS

3,650,510

MIXING AND AERATING APPARATUS FOR PLASTICS

BACKGROUND OF THE INVENTION

In the art of fabricating articles of plastic materials which require a chemical additive to produce the desired end product, it is still quite conventional to add the materials in proper proportion to a receptacle and intimately mix same, either by hand or power stirring, thus producing a batch which is then applied to a mould or the like in which the material cures. Power driven mixers have also been devised which meter the materials in desired proportions to a mixing chamber through which they pass and continuously discharge, as distinguished from the batch mixing technique. In general, the latter type must be designed for use with a specific plastic, or plastics having like characteristics, and which may all be mixed in the same manner. As will be apparent, this has added considerable cost to the equipment, particularly where various plastics must be mixed which require different mixing techniques. Apparently due to the design of former mixing rotors, high speed rotation of the order of 6,000 r.p.m. has been required thus complicating the drive mechanism or requiring special expensive high speed motors if the drive was direct to the rotor shaft. The manner of introducing air to the plastic, particularly of the foaming type which require such air to effect subsequent production of gas bubbles, apparently has not received serious consideration to provide desired improvements such as improved mixing and aeration to thus provide a finished product of consistent characteristics throughout same.

SUMMARY OF THE INVENTION

Mixing and aerating apparatus for liquid plastics and their additives characterized by a common drive means and plastic introduction chamber and different mixing chamber heads which may be interchangeably attached to such drive means for mixing various plastics such as polyesters, polyurethane elastomers and polyurethane foams. The mixing heads vary in design for use with relatively low shear plastics to very high shear plastics. In one embodiment air is aspirated into a mixing chamber by reason of reduced pressure at a point in its flow, whereas in other embodiments it is introduced under pressure adjacent the entry end of the chamber. With some plastics, such as elastomers, the introduction of air is omitted. The apparatus is small in size and its various rotors are driven at a speed of the order of 1,750 r.p.m. as distinguished from former mixers which required speeds of the order to 6.000 r.p.m., thus enabling the use of a conventional low cost electric motor.

Principle objects of the invention are, accordingly, to provide apparatus of the general construction and operation as outlined.

Further objects, advantages and salient features will become more apparent from the description to follow, the appended claims, and the accompanying drawing to now be briefly described.

BRIEF DESCRIPTION OF THE DRAWING

FIG. 1 is a longitudinal central section through one embodiment of the subject of the invention;

FIG. 2 is a section taken on line 2—2, FIG. 1;

FIG. 3 is a isometric view of the rotor of FIG. 1;

FIG. 4 is a side elevation of an alternative form of rotor which may be substituted for the rotor of FIGS. 1 and 2 and be employed with certain of the basic rotor support and conduits of FIG. 1;

FIG. 5 is an end elevation of FIG. 4 as viewed in the direction of arrow 5, FIG. 4;

FIG. 6 is a side elevation of another alternative form of rotor which may be substituted for the rotors previously referred to; and FIG. 7 is an end elevation of the rotor of FIG. 6, as viewed in the direction of arrow 7.

DESCRIPTION OF THE PREFERRED EMBODIMENTS

Referring first to FIG. 1, the apparatus common to all rotors comprises a base member 10, a journal block 12 and a journal and stuffing block 14 which contains certain supply conduits and to which may be replaceably attached a plurality of different mixing chambers and their respective rotors. An axially adjustable stuffing gland 15 compresses a suitable shaft seal or stuffing 16 which may be lubricated with a lubricator 17. Each rotor includes a drive shaft 18 which slideably fits within bearings 19, 19 and secured against longitudinal movement by collars 20, 20. Each mixing chamber casing 22 is provided with a bore 24, closed at one end by an apertured closure 26 through which the mixed material is extruded. Its other end is provided with a flange 28 which may be secured to block 14 by a plurality of headed screws 30, which threadedly engage block 14 and the heads of which engage the flange. As will be apparent, after removal of collars 20, 20 and screws 30 the mixing head and its rotor may be removed and another mixing head and rotor applied to the position shown. Shaft 18 may be secured to a direct drive motor (not shown) by a keyway or spline 32 which engages a coupling or any other type of drive connection which may be quickly detached to permit removal of shaft 18, its attached rotor, and its associated mixing chamber 22.

As best shown in FIG. 2, block 14 is provided with a pair of feed conduits 34, 34 through which the plastic and additive enters the block and a third conduit 36. The latter is provided with a stop cock 38, the purpose of which will subsequently appear. In the operation of the apparatus so far described, the plastic and its additive are delivered to conduits 34, 34 by accurate metering pumps (not shown), preferably of the gear type. As is well known in the mixing art, suitable adjustments may be made to vary the speed of the pumps, or metering valves may be employed, to vary the mixture ratio of the plastic and additive. The replaceable rotors, so far described only in generality, will now be described in detail.

In the embodiment illustrated in FIG. 1, the rotor of which is also better illustrated in FIG. 3, shaft 18 is provided with axially spaced drilled holes 40, each of which receives a pair of mixing blades 42, 42, which are semi-circular in cross section. Initially these are straight and cut to desired length. After inserting a pair in an aperture their ends are spread apart as shown which not only secures them to the shaft but also increases the longitudinal zones of mixing. Also, as illustrated, each pair is indexed 90° to its adjacent pair. The endmost blade 44 however, is preferably straight with its ends twisted relatively in opposite directions so that the flat sides are disposed on the downstream direction and serve the purpose of the blades of a propeller. This blade may be secured by a set screw in the end of shaft 16 (not shown) or be secured in any other desired manner, such as spot welding, brazing or the like. Its function is principally to produce axial flow through the chamber as distinguished from the remaining blades which are not canted like a propeller blade and which serve the principal function of mixing.

Midway between the mixing blades a tube 46 extends into the path of flow of the liquid which is provided with an aperture 48 on its downstream side, the tube communicating with atmosphere through a valve or stop cock 50. As liquid flows around the upstream circular surface of the tube the flow is generally streamline but as it flows around the downstream side it cavitates or produces a void of reduced pressure which causes atmospheric air to enter the flowing liquid stream.

In summary of the operation of this form of the invention it will now be apparent that tube 46 divides the chamber into two sections which serve somewhat different functions. When liquid plastic and the additive are introduced at the right end of the chamber the first four sets of blades provide intimate mixing. Air is then introduced and the remaining blades provide intimate mixing of the introduced air with the already intimate mixed plastic and its additive. Further mixing of the plastic and its additive will, of course, occur as it flows downstream from tube 46. While this embodiment of the invention is of particular utility in adding required air to polyurethane plastics of the foaming type, it is to be recognized that it may otherwise be employed by merely closing valve 50.

Referring now to FIGS. 4 and 5, the rotor shaft 18a is constructed in the same manner as heretofore described, except for its length, so that it may replace the rotor shaft of FIG. 1. Its housing 22a may vary in dimensions but includes a flange 28 (not shown) which renders it attachable to block 14. The construction of this rotor may best be understood from the method of making same. A conventional and readily available helical gear 52 having a conventional tooth shape, such as involute, is provided with a plurality of axially spaced parallel annular grooves or channels 54, preferably of a depth to at least the tooth base circle. As illustrated, four narrow segments are thus formed and two wider segments are formed. It is presently believed that the relative axial width of these segments probably is not critical; however, it is believed that the axial spacing of helical segments, separated by annular axially spaced channels accounts for the improved mixing of plastics which require high shear along their flow. As will be apparent, with proper choice of direction of rotation all of the segments, due to the helical relationship of their teeth, serve as propellers to move the liquid longitudinally in the chamber. As any particular segment discharges fluid into an annular channel, however, there is a discontinuity in the flow as it passes into an annular channel and before it is re-propelled through the next segment. It therefore appears that during the movement across one annular channel to the next helical segment the liquid is subjected to high shear forces transverse to its longitudinal direction of flow as distinguished from a flow which is generally streamlined and without discontinuity of direction of flow. This embodiment is of particular use with polyurethane foams having high shear and require air for nucleation. Such air is introduced through cock 38 which is connected to an air compressor (not shown).

FIGS. 6 and 7 illustrate another form of rotor for producing high shear. The right or entry end of the rotor is provided with worm tooth or thread 56, square in cross section, which is somewhat smaller in diameter than the bore of casing 22b. The direction of rotation is chosen so that the thread serves as an auger to feed the material to the left. Due to fluid friction, flow also occurs in the generally axial direction through the annular space surrounding the worm. The left portion is also formed as a worm tooth or thread 58, square in cross section, but differs in that it is of opposite hand to worm 56 and also fits the casing with small clearance. It further differs in that it is provided with a plurality of angularly spaced slots 60. The shape of these slots can best be understood from the manner of milling same. A conventional circular cutter C (FIG. 7), rectangular in cross section, was disposed relative to the worm in such manner that its central plane P was canted to a diameter of the worm. The depth of the slot at point 62 was thus greater than at point 64. The plane of the cutter was also canted relative to a diametral plane of the worm. A straight cut was then made, without relative rotary motion of the cutter and worm, producing a slot which approachs a spiral but without the constant angular twist characteristic of a true spiral which advances around a cylindrical surface at a constant angle with respect to its axial advance which thus produces a warped or twisted configuration. Also, in an operational embodiment the slots were angularly indexed to produce 6 slots forming a pair of diametrically opposed lands 66 and a pair of lands 68, 68 therebetween, the latter being of lesser angular extent than the former. The construction just described has been found to produce satisfactory mixing; however, due to the extremely difficult task of observing precisely what action takes place along the axial length of interrupted worm 58, is cannot be stated with certainty how critical the shape and angle of the slots and their non-uniform indexing may be. It is presently believed, however, that the slots should be generally helical and the non-uniform indexing may produce a flow pattern which is not uniform in nature, hence subjecting the material to changing shear forces as it passes generally axially through screw 58, thus enhancing the mixing action. This embodiment is of particular utility for use with polyurethane elastomers having high shear but do not foam. In such use, no air is supplied through cock 38.

The bore diameter of all of the casings is of the order of 1½ inches and their lengths vary as will be apparent from FIGS. 3, 4 and 5. Shafts 16 will thus also vary in length. The three units described which are replaceable on the bearing supports thus each comprise a shaft, its attached rotor and a casing having a flanged end which interchangeably fit bearing block 14, thus eliminating duplication of the main bearing supports, motor and drive connections. The motor, moreover, may be reversible depending upon the direction of rotation required to produce axial feeding or pumping through the various rotors.

What is claimed is:

1. Apparatus for mixing liquid plastics and additives for the same, comprising:

shaft support means forming an introduction chamber for receiving a metered proportion of the plastic and additive, said chamber having an open side and said support means being constructed to have a plurality of mixing head casings interchangeably affixed thereto wherein each such mixing head casing has a bore therein which is open at one end for communicating with said introduction chamber and has an outlet opening through which the mixture may be delivered which is remote from said one end and in communication with said bore;

a rotatable drive shaft extending through said support means and said chamber;

a shaft seal associated with said support means and engageable with said shaft; and a mixing rotor affixed to said shaft and rotatable in said bore, said rotor having a plurality of axially-spaced, radially-projecting pairs of half-round pins extending through radial apertures through the shaft, at least some of said pairs being spread apart at opposite ends thereof for mixing the plastic and additive and for pumping it toward said outlet opening.

2. Apparatus, as claimed in claim 1, wherein:
each pair of pins is indexed with respect to an adjacent set of pins.

3. Apparatus, as claimed in claim 2, wherein:
said indexing is 90° with respect to an adjacent pair of pins.

4. Apparatus, as claimed in claim 1, wherein:
at least one of said pins is canted so that its flat side forms the downstream surface of a propeller blade.

5. Apparatus, as claimed in claim 1, further including:
a tube affixed to the casing having an end disposed between adjacent pairs of pins, said tube having an aperture in the downstream side thereof through which air may be aspirated into the mixture as it passes around the tube in a hydrodynamic foil.

6. Apparatus for mixing liquid plastics and additives for the same, comprising:

shaft support means forming an introduction chamber for receiving a metered proportion of the plastic and additive, said chamber having an open side and said support means being constructed to have a plurality of mixing head casing interchangeably affixed thereto wherein each such mixing head has a bore therein which is open at one end for communicating with said introduction chamber and has an outlet opening through which the mixture may be delivered which is remote from said one end and in communication with said bore;

a rotatable drive shaft extending through said support means and said chamber;

a shaft seal associated with said support means and engageable with said shaft;

a mixing rotor affixed to said shaft and rotatable in said bore, said rotor having a plurality of axially-spaced radially projecting pairs of half-round pins extending through radial apertures through the shaft, at least some of said pairs being spread apart at opposite ends thereof for mixing the plastic and additive and for pumping it toward said outlet opening, each of said pairs of pins being indexed 90° with respect to an adjacent set of pins, at least one of said pins being canted so that its flat side forms the downstream surface of a propeller blade; and a tube affixed to the casing having an end disposed between adjacent pairs of pins, said tube having an aperture in the downstream side thereof through which air may be aspirated into the mixture as it passes around the tube in a hydrodynamic foil.

7. Apparatus for mixing liquid plastics and additives for the same, comprising:

shaft support means forming an introduction chamber for receiving a metered proportion of the plastic and additive, said chamber having an open side and said support means being constructed to have a plurality of mixing head casings interchangeably affixed thereto wherein each such mixing head has a bore therein which is open at one end for communicating with said introduction chamber and has an outlet opening through which the mixture may be delivered which is remote from said one end and in communication with said bore;

a rotatable drive shaft extending through said support means and said chamber;

a shaft seal associated with said support means and engageable with said shaft; and a mixing rotor affixed to said shaft and rotatable in said bore, said rotor being provided with a first worm tooth of a diameter less than said bore adapted to propel the mixture toward said outlet, and a second worm tooth axially spaced from the first worm tooth having a plurality of angularly spaced generally helical grooves therein providing channels for discontinuity in flow through the second worm tooth, the second worm tooth being of opposite hand to the first worm and of a diameter substantially fitting said bore.

* * * * *